US009558093B2

(12) United States Patent
Sadovsky et al.

(10) Patent No.: US 9,558,093 B2
(45) Date of Patent: Jan. 31, 2017

(54) VISUAL TOOLS FOR FAILURE ANALYSIS IN DISTRIBUTED SYSTEMS

(71) Applicant: Microsoft Corporation, Redmond, WA (US)

(72) Inventors: Art Sadovsky, Bellevue, WA (US); Venkat Narayanan, Redmond, WA (US); Smita Ojha, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 191 days.

(21) Appl. No.: 14/447,591

(22) Filed: Jul. 30, 2014

(65) Prior Publication Data
US 2016/0034334 A1    Feb. 4, 2016

(51) Int. Cl.
*G06F 11/32* (2006.01)
*G06F 11/07* (2006.01)
*G06F 11/34* (2006.01)
*G06F 11/30* (2006.01)

(52) U.S. Cl.
CPC ............ *G06F 11/321* (2013.01); *G06F 11/07* (2013.01); *G06F 11/0709* (2013.01); *G06F 11/0772* (2013.01); *G06F 11/323* (2013.01); *G06F 11/324* (2013.01); *G06F 11/3082* (2013.01); *G06F 11/3414* (2013.01); *G06F 11/3495* (2013.01)

(58) Field of Classification Search
None
See application file for complete search history.

(56) References Cited

U.S. PATENT DOCUMENTS

| 5,819,028 A | 10/1998 | Manghirmalani et al. |
|---|---|---|
| 6,456,306 B1 | 9/2002 | Chin et al. |
| 6,950,865 B1 | 9/2005 | Depaolantonio |
| 7,313,736 B2 | 12/2007 | Scrandis et al. |
| 8,015,139 B2 | 9/2011 | Bahl et al. |
| 8,156,378 B1 | 4/2012 | Suit |
| 8,700,953 B2* | 4/2014 | Kato ................ G06F 11/0709 714/26 |

(Continued)

OTHER PUBLICATIONS

"International Search Report & Written Opinion Issued in PCT Application No. PCT/US2015/041872", Mailed Date: Oct. 7, 2015, 11 Pages.

(Continued)

*Primary Examiner* — Albert Decady
*Assistant Examiner* — Paul Contino
(74) *Attorney, Agent, or Firm* — Anand Gupta; Tom Wong; Micky Minhas (57) ABSTRACT

Visual tools are provided for failure analysis in distributed systems. Errors from synthetic measurements and usage data associated with a cloud based service are aggregated by a management application. The errors are processed to create a distribution that segments the errors based on components of the cloud based service. A failed component that generates a subset of the errors associated with a failure is highlighted. The failed component is one of the components of the cloud based service. The distribution is provided in a visualization to identify the failure by emphasizing the failed component with a failure information in proximity to the failed component.

19 Claims, 7 Drawing Sheets

(56) References Cited

U.S. PATENT DOCUMENTS

| | | | |
|---|---|---|---|
| 2002/0198984 A1 | 12/2002 | Goldstein et al. | |
| 2003/0074606 A1* | 4/2003 | Boker | G06F 11/3495 714/42 |
| 2006/0123389 A1* | 6/2006 | Kolawa | G06F 11/3616 717/101 |
| 2008/0263410 A1* | 10/2008 | Mittal | G06F 11/3414 714/47.2 |
| 2009/0113246 A1* | 4/2009 | Sabato | G06F 11/0769 714/37 |
| 2010/0115341 A1* | 5/2010 | Baker | G06F 11/0709 714/37 |
| 2010/0174945 A1* | 7/2010 | Watanabe | G06F 11/0709 714/26 |
| 2010/0185961 A1 | 7/2010 | Fisher et al. | |
| 2011/0161743 A1* | 6/2011 | Kato | G06F 11/0709 714/47.2 |
| 2011/0261055 A1 | 10/2011 | Wong et al. | |
| 2013/0239111 A1 | 9/2013 | Bingham et al. | |

OTHER PUBLICATIONS

Gao, et al., "Approaches to Building Self-Healing Systems using Dependency Analysis", In IEEE/IFIP Network Operations and Management Symposium, vol. 1, Apr. 23, 2004, 14 pages.

Tian, et al., "Probabilistic Failure Detection for Efficient Distributed Storage Maintenance", In Proceedings of the Symposium on Reliable Distributed Systems, Oct. 6, 2008, 10 pages.

\* cited by examiner

VISUAL TOOLS FOR FAILURE ANALYSIS IN DISTRIBUTED SYSTEMS

BACKGROUND

Distributed computing technologies have enabled multiple computing resources to provide coordinated and distinct solutions. An example of distributed computing, cloud computing brings together multiple systems to provide solutions to user needs. Cloud computing can span a vast array of computing resources. The computing resources utilized in cloud computing applications and services are dispersed across networks and locations. Dispersed computing resources are remotely controlled and managed. Usually, manual solutions provide installation and configuration support to cloud computing assets. Manual installation solutions by human components of widely dispersed computing resources are not cost effective.

Conventional error monitoring solutions for cloud computing systems have limitations. Individual components of the cloud computing systems monitor health related metrics locally. Information generated by monitoring processes are usually consumed locally. Any actions based on the information are attempted locally and results of the actions may be logged or discarded locally.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing visual tools for failure analysis in distributed systems. In some example embodiments, a management application of a cloud based service may aggregate errors from synthetic measurements and usage data associated with the cloud based service. The usage data may include output of customer actions associated with a use scenario of the cloud based service. The synthetic measurements may include output of simulations of the customer actions. The management application may process the errors to create a distribution that segments the errors based on components of the cloud based service. A failed component may be highlighted that generates a subset of the errors associated with a failure, where the failed component is one of the components. The distribution may be provided in a visualization to identify the failure by emphasizing the failed component with a failure information in proximity to the failed component.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, visual tools for failure analysis in distributed systems may be provided by a management application. The management application may aggregate errors from synthetic measurements and usage data associated with a cloud based service. The errors may be processed to create a distribution that segments the errors based on components of the cloud based service. A failed component may be highlighted that generates a subset of the errors associated with a failure, where the failed component is one of the components. The distribution may be provided in a visualization to identify the failure by emphasizing the failed component with a failure information in proximity to the failed component.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, and a flash drive.

Throughout this specification, the term "platform" may be a combination of software and hardware components to provide visual tools for failure analysis in distributed systems. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example embodiments may be found in the following description.

Figure 1:
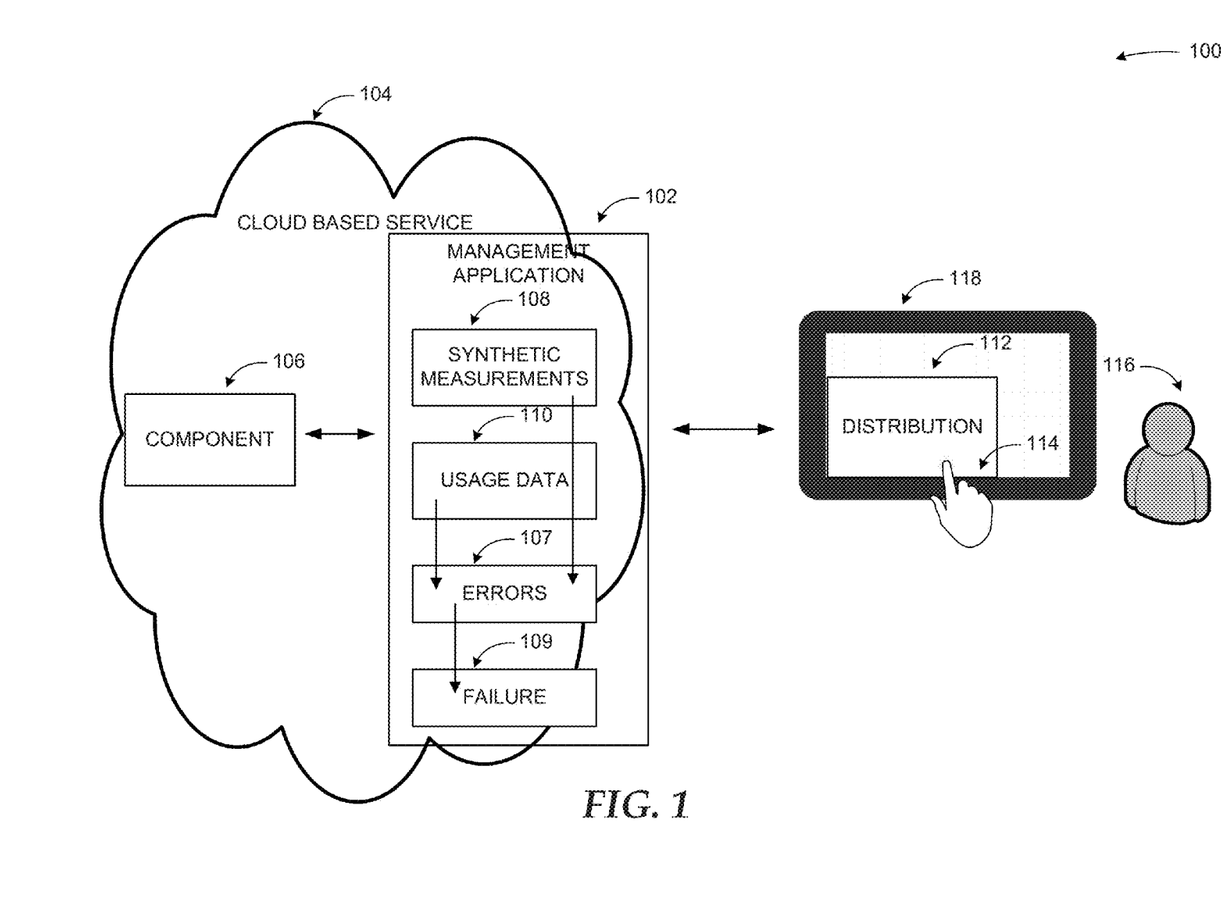
FIG. 1 is a conceptual diagram illustrating components of a scheme to provide visual tools for failure analysis in distributed systems, according to embodiments.

FIG. 1 is a conceptual diagram illustrating components of a scheme to provide visual tools for failure analysis in distributed systems, according to embodiments.

In a diagram 100, a cloud based service 104 may provide services to a customer 116 through a client device 118. The cloud based service 104 may be an example of a distributed system that includes multiple components interacting to provide one or more services. The cloud based service 104 may provide an expansive variety of services through a client interface at the client device 118. The services may include document sharing, e-mail services, storage services, among others. In addition, the customer 116 (who is authorized to interact with the client device 118) may be an entity that includes a person, multiple persons, a group of persons, an organization, among others.

The cloud based service 104 may be a distributed application that provides services through one or more computing devices that execute one or more components of the distributed application. The one or more computing devices may be connected through one or more networks that use wired or wireless infrastructure. An example of the cloud based service 104 may include an e-mail service. The e-mail service may be hosted in multiple computing devices. The e-mail service may be divided between the computing devices based on an available processing capacity of each computing device. The e-mail service may be provided through multiple components that provide directory functionality, networking functionality, mailbox functionality, among others.

In another example scenario, the cloud based service 104 may include a document sharing service. The document sharing service may distribute stored documents across multiple computing devices based on available storage capacity of each computing device. The document sharing service may be provided through multiple components that provide directory functionality, networking functionality, document hosting functionality, among others. The examples of the cloud based service 104 as an e-mail service and a document sharing service were not provided in a limiting sense. The cloud based service 104 may include any distributed computation solution that provides a service to one or more customers such as the customer 116.

The customer 116 may be allowed to interact with the cloud based service 104 through the client device 118. The client device 118 may include a number of computing devices such as a desktop computer, a smart phone, a notebook computer, a tablet computer, among others. The customer 116 may interact with the cloud based service 104 through a client interface of the cloud based service 104 that is provided by the client device 118. Alternatively, the cloud based service 104 may provide the client interface and the client device 118 may render the client interface within a client application. The customer 116 may interact with the client interface through a number of input modalities that may include a touch based action 114, a keyboard based input, a mouse based input, among others. The touch based action 114 may include a number gestures such as touch action, a swipe action, among others.

A management application 102 may analyze synthetic measurements 108 and usage data 110 to determine a failure associated with a component 106 of the cloud based service 104. The management application 102 may be another component of the cloud based service 104. Alternatively, the management application may be a stand-alone application that provides analysis service in relation with distributed systems such as the cloud based service 104.

The usage data 110 may include output of customer actions associated with a use scenario of the cloud based service 104. An example of the customer actions may include a customer 116 initiating an authentication scheme with the cloud based service 104 and interacting with the client interface of the cloud based service 104. In an e-mail service as an example of the cloud based service 104, examples of the customer actions may include the customer 116 authenticating into a client interface, retrieving e-mail, and interacting with the e-mail. In a document sharing service as an example of the cloud based service 104, examples of the customer actions may include the customer 116 authenticating with a client interface, retrieving a document, and interacting with the document.

The synthetic measurements 108 may include output of simulations of the customer actions. The usage data 110 may be retrieved from log files from components of the cloud based service 104 or client devices such as the client device 118 capturing measurements of the use scenario. The synthetic measurements 108 may be executed by the management application 102 to determine a health of the cloud based service 104 by detecting failures associated with simulated use scenarios. The output of the usage data 110 and the synthetic measurement 108 may be parsed to detect errors 107 associated with components of the cloud based service such as the component 106. The component 106 may include a hardware component such as a server, a networking device, a processor, a memory, a storage device, among others.

The errors 107 detected from the synthetic measurements 108 and the usage data 110 may be aggregated. The errors 107 may be aggregated based on criteria that includes an error type, an identification of an associated component of the cloud based service 104, a type of the associated component, among others. The errors 107 may be processed to create a distribution 112 that segments the errors 107 based on components of the cloud based service 104. In an example scenario, the errors 107 associated with the component 106 may be used to create a segment of the distribution.

The failed component such as the component 106 that generates a subset of the errors 107 associated with a failure 109 may be highlighted. The failure may be identified by computing a percentage of the subset of the errors 107 associated with the failed component by dividing the number of the subset with the number of the errors 107. The segment of the distribution 112 associated with the failure 109 may be highlighted with a graphical scheme that includes a coloring scheme, a background variation of the segment from similar items in the distribution 112, an animation applied to the segment, a line size increase or variation of the segment (for example a line color change and a dash type change), among others.

The distribution 112 may be rendered at a client interface displayed on the client device 118. The distribution 112 may be rendered in a visualization such as histogram, a pie chart, a graph, among others. The management application may provide the distribution 112 to emphasize failure information in proximity to the failed component to identify the failure 109. The visualization may include distribution 112 displayed in a web page as a user interface (UI) of the management application 102. The distribution 112 may include the errors 107 processed during a time period by the management application 102 to identify the failure 109 associated with the component 106.

In addition to providing visual tools for failure analysis of the cloud based service 104, the management application 102 may also be configured to provide visual tools for failure analysis of other cloud based services. The management application 102 may be configured to display the visual tools for other cloud based services in different renderings of the UI. Alternatively, the management application 102 may provide features to integrate failure analysis between the cloud based service 104 and other cloud based services.

While the example system in FIG. 1 has been described with specific components including the cloud based service 104 and the distribution 112, embodiments are not limited to these components or system configurations and can be implemented with other system configuration employing fewer or additional components.

Figure 2:
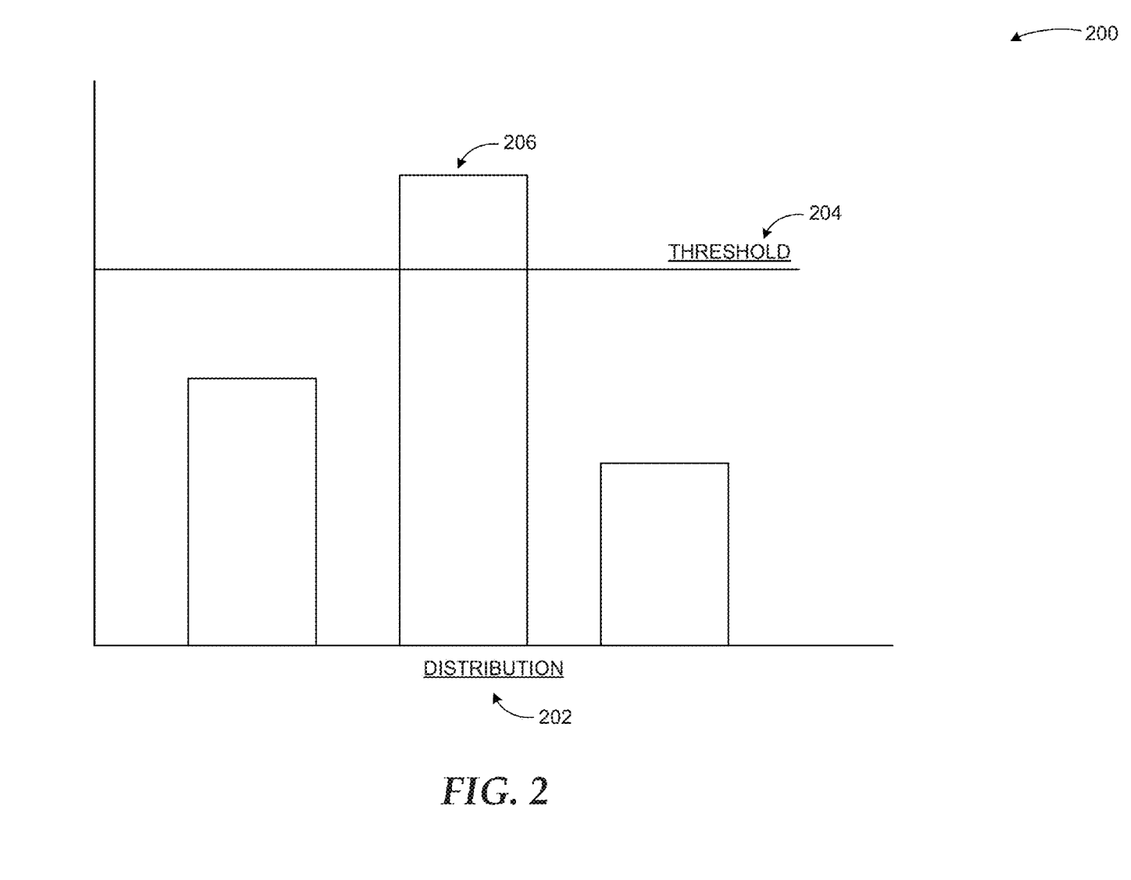
FIG. 2 illustrates an example of a visualization of a distribution that provides failure analysis in distributed systems, according to embodiments.

FIG. 2 illustrates an example of a visualization of a distribution that provides failure analysis in distributed systems, according to embodiments.

In a diagram 200, a distribution 202 that provides visual tools for failure analysis in a cloud based service may be described. A management application may generate the distribution 202 from errors identified in output of synthetic measurements and usage data of the cloud based service. The usage data may be anonymized prior to processing by removing customer identification data such as IP addresses of the customer, among others. The errors may be separated into groups based on an association with the components. A histogram may be created from the groups as the distribution 202. Each of the groups may be presented as segments of the distribution 202.

According to some examples, a percentage value of the segments may be compared to a threshold 204. The percentage value may be computed by dividing a number of errors in one of the segments such as the segment 206 with a number of the errors and multiplying the resulting value with 100. In response to a determination that the percentage value exceeds the threshold 204, the failed component associated with the segment 206 may be identified as the source of the failure. In addition, the threshold 204 may be configurable by a stakeholder such as an administrator of the cloud based service and a member of a team that manages the failed component. The stakeholder may be allowed to increase or decrease a value of the threshold 204 to decrease or increase a sensitivity of the management application detect the failure of the cloud based service.

Figure 3:
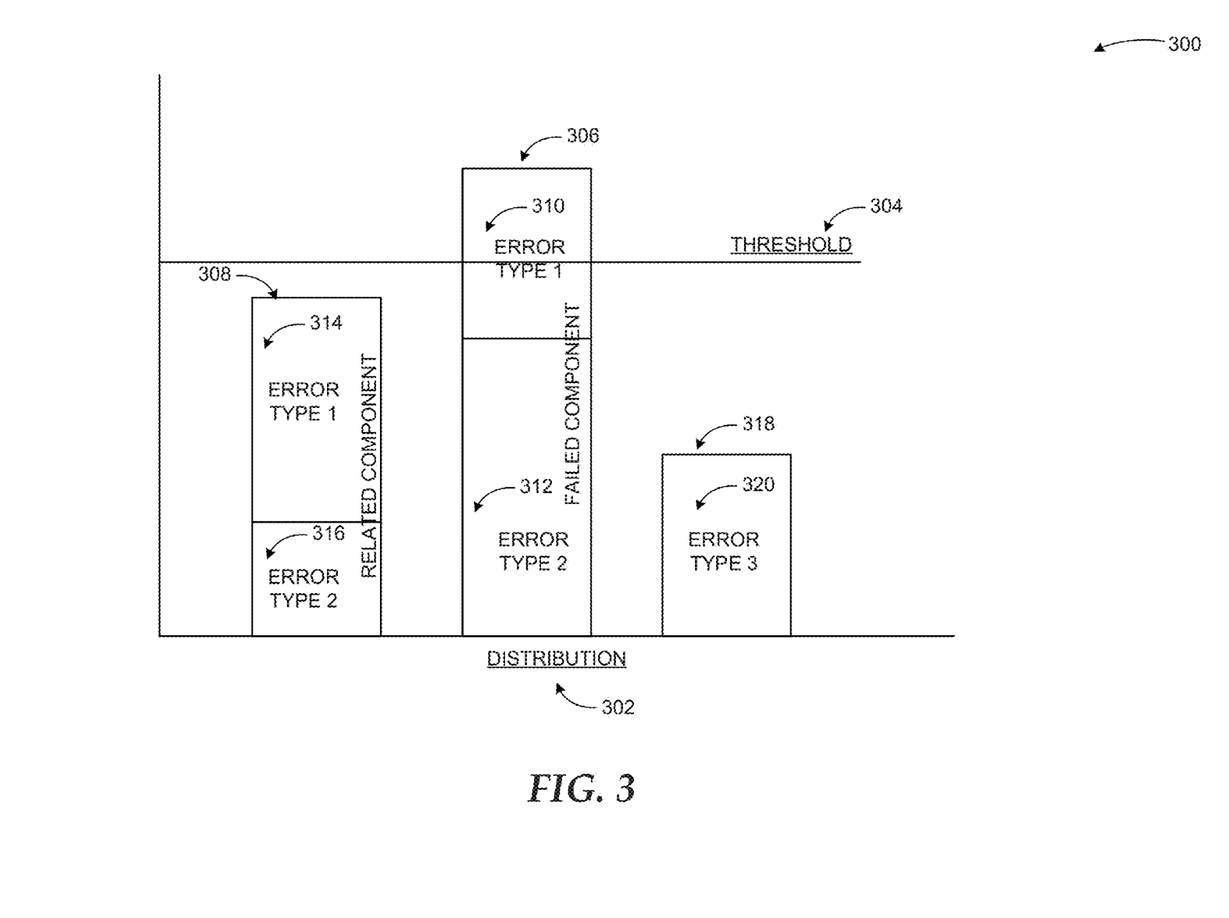
FIG. 3 illustrates another example of a visualization of a distribution that provides failure analysis in distributed systems, according to embodiments.

FIG. 3 illustrates another example of a visualization of a distribution that provides failure analysis in distributed systems, according to embodiments.

In a diagram 300, a management application may provide failure analysis in a cloud based system. A distribution 302 may be generated from output of synthetic measurements and usage data of the cloud based service. The output data may be analyzed to detect errors associated with components of the cloud based service. The errors may be parsed and processed to generate segments of the distribution 302 based on associations between errors and components.

According to some examples, the management application may provide a visualization that includes the distribution 302. The visualization may include a web page rendered at a UI of the management application. The distribution 302 may identify a failed component 306 of the cloud based service. The failed component 306 may be detected based on a subset of errors associated with the failed component exceeding a threshold 304.

The failed component 306 may be highlighted with failure information by including a time period associated with the subset of the errors that were generated by the failed component 306. The type of the errors may be labelled to describe the errors to a stakeholder of the distribution 302. The type of the errors may include an error type 1 (310) or an error type 2 (312). The error types may be sorted based on a criteria of relevance to the stakeholder. An example may include network outage errors labelled as the error type 1 (310). The network outage errors may be of a higher value to a network team associated with the failed component 306. The error type 2 (312) such as storage subsystem input/output (I/O) errors may have a lower relevance to the network team. As a result, the error type 2 (312) may be placed below the error type 1 (310).

The management application may also identify a related component 308 in the distribution 302. The related component 308 associated with the failed component 306 may be detected based on a relation that includes a shared connection, a shared data resource, a shared operation, among others. The errors associated with the related component 308 may be partitioned based on a criteria such as error type. The errors may be ranked and placed based on relevancy to a stakeholder based on error type similar to the errors of the failed component 306. An error type 1 (314) may be placed above an error type 2 (316) based on relevancy of the error type 1 (314) being higher than the error type 2 (316) to the stakeholder.

The related component 308 and other related components may be ranked based on an associated percentage of the errors generated by the related components. The related components may be placed in proximity to the failed component within the distribution 302 based on the associated percentage to highlight the related components affected by the failure. The related component 308 with a percentage of the errors higher than other related components may be placed next to the failed component 306. Other related components may be placed in adjacent positions based on associated percentage of the errors. Another related component with a lower percentage of the errors than the related component 308 may be placed next to the related component 308 but not adjacent to the failed component 306. The related components may be placed in proximity to the failed component 306 to emphasize to the stakeholder that the related components may need to be considered along with the failed component 306.

In addition, other component 318 may be placed in the distribution. The other component 318 may generate errors. The errors may be partitioned to error types which may be labeled with an error type such as an error type 3 (320). Other component 318 may not be related to the failed component 306. The other component 318 may generate errors but not sufficient to exceed the threshold 304 to necessitate an emphasis.

Figure 4:
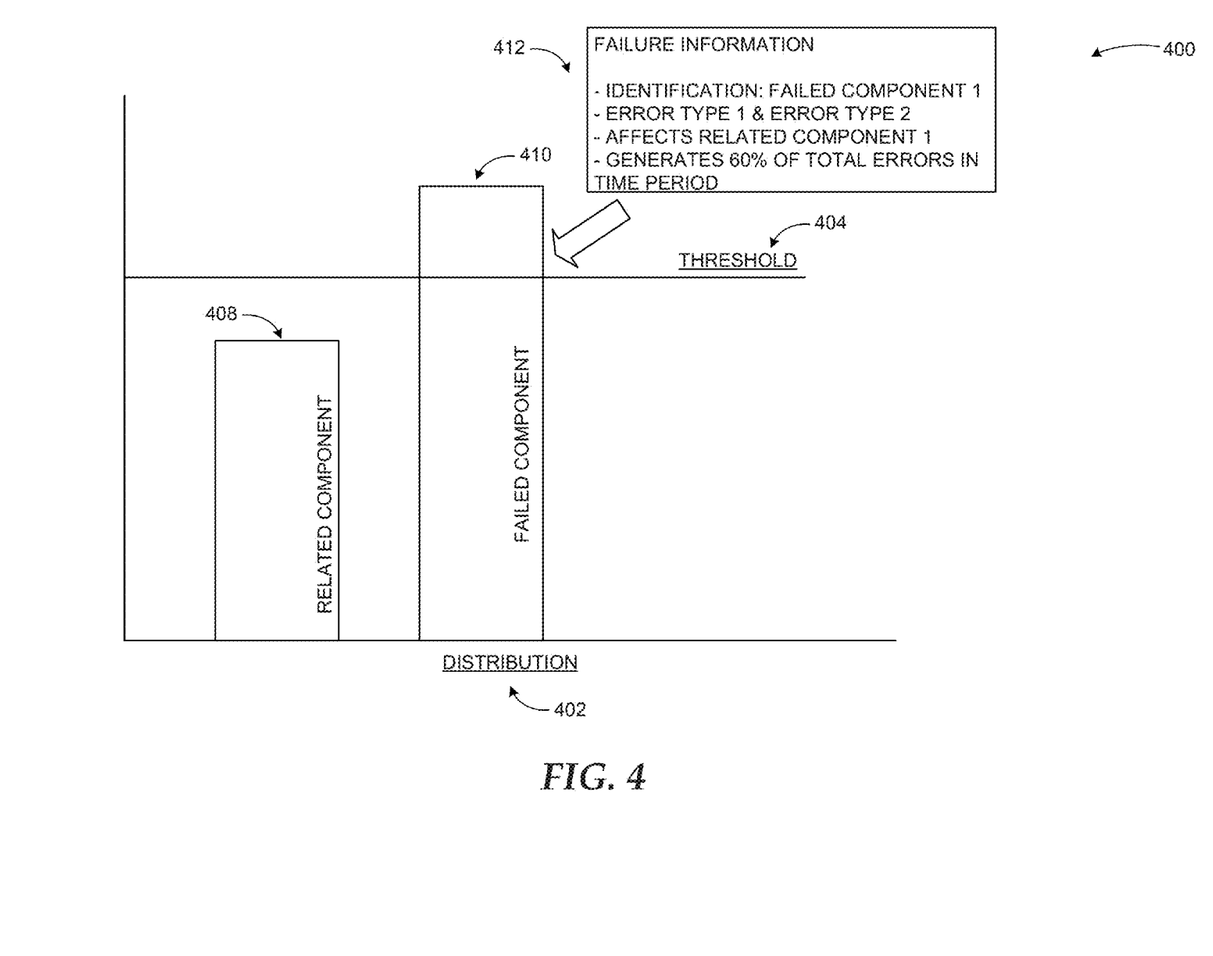
FIG. 4 illustrates another example of a visualization of a distribution that provides failure analysis in distributed systems, according to embodiments.

FIG. 4 illustrates another example of a visualization of a distribution that provides failure analysis in distributed systems, according to embodiments.

In a diagram 400, a management application may generate a distribution 402 to emphasize a failed component 410 that generates errors that exceed a threshold 404. More than one component may exceed the threshold 404 and cause a failure of the cloud based service. In addition, a related component 408 may be placed adjacent to the failed component to draw attention to the related component and errors generated by the related component 408.

According to some examples, failure information 412 may be provided by the management application to emphasize the failure at the failed component 410. The failure information 412 may identify the failed component 410 with an identification of the failed component, a percentage of the subset of the errors associated with the failed component 410, or a frequency of the subset within the distribution 402. The failure information 412 may be presented as a pop-up pane in proximity to the failed component 410, as text within the failed component 410, or as a similar scheme.

An access privilege of a stakeholder may be detected through an authentication scheme. The management application may provide an administrator of the cloud based service (as the stakeholder) access to view granular information associated with the errors associated with the failed component 410, related component 408, and other components of the cloud based service. The management application may also provide a member of a team that manages the failed component 410 (as the stakeholder) access to view granular information associated with the errors associated with the failed component 410 and related component 408 of the cloud based service. Access to the errors associated with other components of the cloud based service may be limited or restricted to the team member that manages the failed component 410.

The technical effect of the visual tools for failure analysis in distributed systems may be an enhancement of error analysis to encompass the distributed system and components of the distributed system compared to individual component based solutions.

The example scenarios and schemas in FIGS. 2 and 4 are shown with specific components, data types, and configurations. Embodiments are not limited to systems according to these example configurations. Providing visual tools for failure analysis in distributed systems may be implemented in configurations employing fewer or additional components in applications and user interfaces. Furthermore, the example schema and components shown in FIGS. 2 and 4 and their subcomponents may be implemented in a similar manner with other values using the principles described herein.

Figure 5:
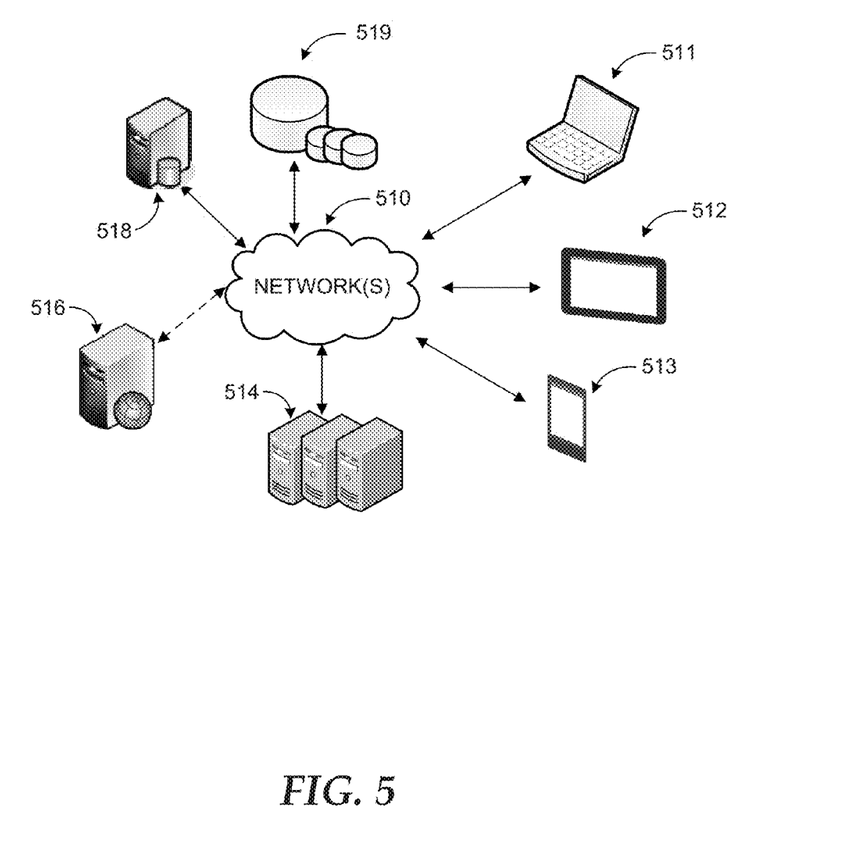
FIG. 5 is a simplified networked environment, where a system according to embodiments may be implemented.

FIG. 5 is an example networked environment, where embodiments may be implemented. A manager application configured to provide visual tools for failure analysis in distributed systems may be implemented via software executed over one or more servers 514 such as a hosted service. The platform may communicate with client applications on individual computing devices such as a smart phone 513, a laptop computer 512, or desktop computer 511 ('client devices') through network(s) 510.

Client applications executed on any of the client devices 511-513 may facilitate communications via application(s) executed by servers 514, or on individual server 516. A management application may process errors from synthetic measurements and usage data of a cloud based service to create a distribution that segments the errors based on components of the cloud based service. One or more components that fail may be highlighted in the distribution and provided through a visualization. The management application may store data associated with the distribution in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to provide visual tools for failure analysis in distributed systems. Furthermore, the networked environments discussed in FIG. 5 are for illustration purposes only. Embodiments are not limited to the example applications, modules, or processes.

Figure 6:
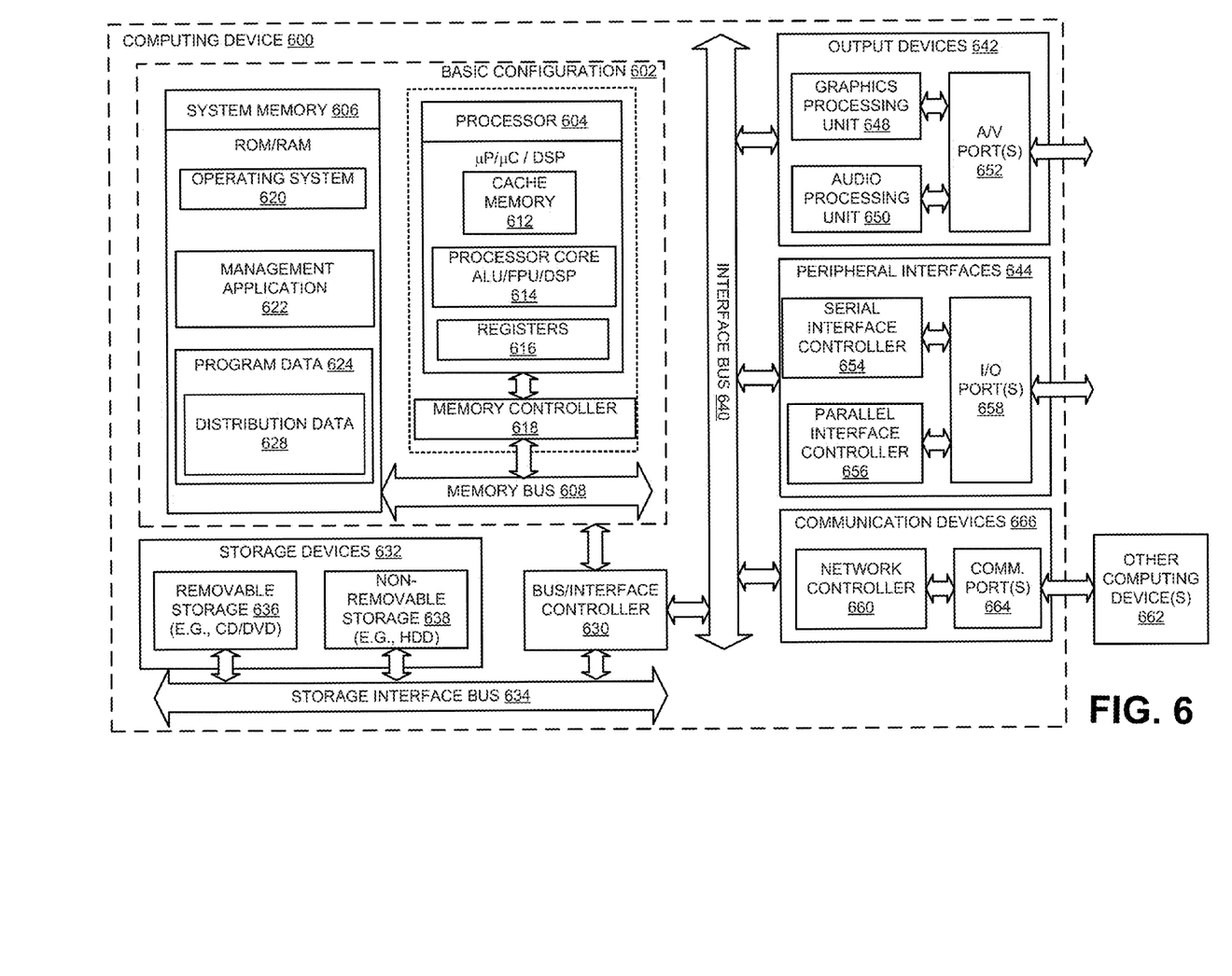
FIG. 6 illustrates a general purpose computing device, which may be configured to provide visual tools for failure analysis in distributed systems.

FIG. 6 illustrates a general purpose computing device, which may be configured to provide visual tools for failure analysis in distributed systems, arranged in accordance with at least some embodiments described herein.

For example, the computing device 600 may be used to provide visual tools for failure analysis in distributed systems. In an example of a basic configuration 602, the computing device 600 may include one or more processors 604 and a system memory 606. A memory bus 608 may be used for communication between the processor 604 and the system memory 606. The basic configuration 602 may be illustrated in FIG. 6 by those components within the inner dashed line.

Depending on the desired configuration, the processor 604 may be of any type, including, but not limited to, a microprocessor (µP), a microcontroller (µC), a digital signal processor (DSP), or any combination thereof. The processor 604 may include one more levels of caching, such as a level cache memory 612, a processor core 614, and registers 616. The processor core 614 may include an arithmetic logic unit (ALU), a floating point unit (FPU), a digital signal processing core (DSP Core), or any combination thereof. A memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a management application 622, and a program data 624. The management application 622 may create a distribution of errors partitioned based on components that generate errors at a cloud based service. The program data 624 may include, among other data, a distribution data 628, or the like, as described herein. The distribution data 628 may include information associated with errors and failures.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636, and the non-removable storage devices 638 may be examples of computer storage media. Computer storage media may include, but may not be limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 666) to the basic configuration 602 via the bus/interface controller 630. Some of the example output devices 642 may include a graphics processing unit 648 and an audio processing unit 650, which may be configured to communicate to various external devices, such as a display or speakers via one or more A/V ports 652. One or more example peripheral interfaces 644 may include a serial interface controller 654 or a parallel interface controller 656, which may be configured to communicate with external devices, such as input devices (for example, keyboard, mouse, pen, voice input device, touch input device, etc.) or other peripheral devices (for example, printer, scanner, etc.) via one or more I/O ports 658. An example communication device 666 may include a network controller 660, which may be arranged to facilitate communications with one or more other computing devices 662 over a network communication link via one or more communication ports 664. The one or more other computing devices 662 may include servers, client equipment, and comparable devices.

The network communication link may be one example of a communication media. Communication media may be embodied by computer-readable instructions, data structures, program modules, or other data in a modulated data signal, such as a carrier wave or other transport mechanism, and may include any information delivery media. A "modulated data signal" may be a signal that has one or more of the modulated data signal characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer-readable media, as used herein, may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include visual tools for failure analysis in distributed systems. These methods may be implemented in any number of ways, including the structures described herein. One such way may be by machine operations, using devices of the type described in the present disclosure. Another optional way may be for one or more of the individual operations of the methods to be performed in conjunction with one or more human operators performing some of the operations while other operations may be performed by machines. These human operators need not be co-located with each other, but each may be with a machine that performs a portion of the program. In other examples, the human interaction may be automated such as by pre-selected criteria that may be machine automated.

Figure 7:
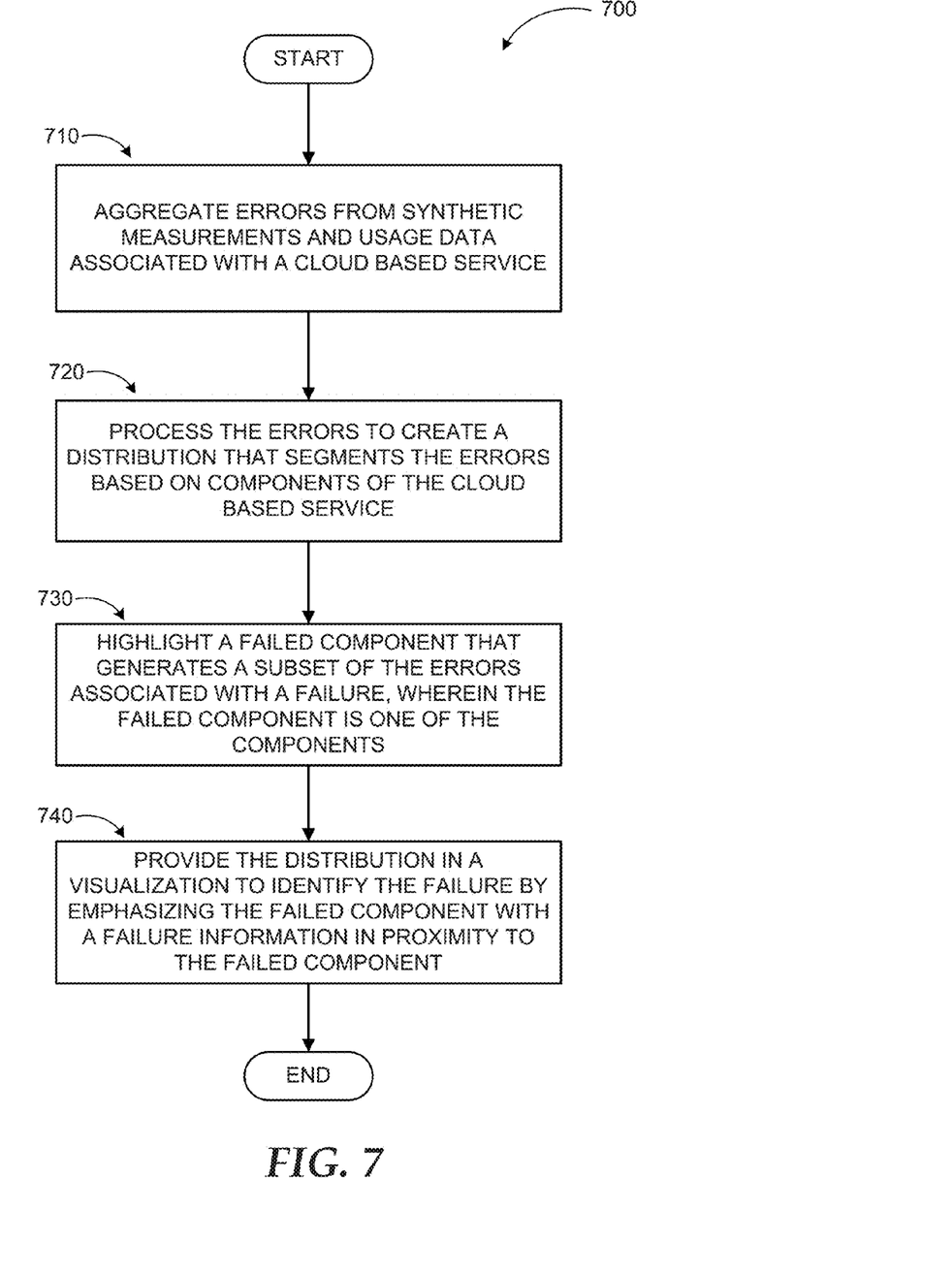
FIG. 7 illustrates a logic flow diagram for a process to provide visual tools for failure analysis in distributed systems, according to embodiments.

FIG. 7 illustrates a logic flow diagram for a process to provide visual tools for failure analysis in distributed systems, according to embodiments. Process 700 may be implemented on a management application of the cloud based service.

Process 700 begins with operation 710, where errors from synthetic measurements and usage data associated with a cloud based service may be aggregated. The usage data may include output of customer actions associated with a use scenario of the cloud based service. The synthetic measurements may include output of simulations of the customer actions. At operation 720, the errors may be processed to create a distribution that segments the errors based on components of the cloud based service. A failed component that generates a subset of the errors may be highlighted at operation 730, where the failed component may be one of the components of the cloud based service. At operation 740, the distribution may be provided in a visualization to identify the failure by emphasizing the failed component with a failure information in proximity to the failed component.

The operations included in process 700 are for illustration purposes. A management application according to embodiments may be implemented by similar processes with fewer or additional steps, as well as in different order of operations using the principles described herein.

According to some examples, a method that is executed on a computing device to provide visual tools for failure analysis in distributed systems may be described. The method may include aggregating errors from synthetic measurements and usage data associated with a cloud based service, processing the errors to create a distribution that segments the errors based on components of the cloud based service, highlighting a failed component that generates a subset of the errors associated with a failure, where the failed component is one of the components, and providing the distribution in a visualization to identify the failure by emphasizing the failed component with a failure information in proximity to the failed component.

According to other examples, the method may further include anonymizing the usage data that includes output of one or more customer actions associated with a use scenario of the cloud based service and parsing the usage data and the synthetic measurements that include output of simulations of the one or more customer actions. The synthetic measurements and the usage data may be aggregated based on one or more criteria that includes one or more from a set of: an error type, an identification of an associated component of the cloud based service, and a type of the associated component, where the synthetic measurements and the usage data are collected during a shared time period. The errors may be separated into groups based on an association with the components and a histogram may be created from the groups as the distribution.

According to further examples, the method may further include computing a percentage of the errors associated with the subset of the errors by dividing a number of the subset with a number of the errors, in response to a determination that the percentage exceeds a threshold, identifying the failed component as a source of the failure, highlighting the failed component with failure information by including a time period of the subset and a type of the subset in the distribution in proximity to the failed component. Failure information may be provided with one or more from a set of an identification of the failed component, a percentage of the subset, and a frequency of the subset within the distribution to identify the failed component.

According to some examples, the method may further include detecting related components associated with the failed component based on a relation that includes one or more from a set of a shared connection, a shared data resource, and a shared operation, ranking the related components based on an associated percentage of the errors generated by the related components, and placing the related components in proximity to the failed component based on the associated percentage to highlight the related components affected by the failure.

According to some examples, a computing device to provide visual tools for failure analysis in distributed systems may be described. The computing device may include a memory, a processor coupled to the memory. The processor may be configured to execute a management application in conjunction with instructions stored in the memory. The management application may be configured to aggregate errors from synthetic measurements and usage data associated with a cloud based service, where the usage data include anonymized output of customer actions of a use scenario of the cloud based service and the synthetic measurements include output of simulations of the customer actions, process the errors to create a distribution that segments the errors based on components of the cloud based service, highlight a failed component that generates a subset of the errors associated with a failure, where the failed component is one of the components, and provide the distribution in a visualization to identify the failure by emphasizing the failed component with a failure information in proximity to the failed component.

According to other examples, the management application is further configured to detect an access privilege of a stakeholder through an authentication scheme, where the stakeholder is an administrator of the cloud based service and provide access to view granular information associated with the errors associated with the failed component, related components to the failed component, and other components of the cloud based service.

According to some examples, the management application is further configured to detect an access privilege of a stakeholder through an authentication scheme, where the stakeholder is a member of a team that manages the failed component of the cloud based service, provide access to view granular information associated with the errors associated with the failed component and the errors associated with related components to the failed component, and limit access to the errors associated with other components of the cloud based service. A stakeholder may be allowed to configure a threshold associated with detecting the failure, where the stakeholder includes an administer of the cloud based service and a team that manages the failed component of the cloud based service According to some examples, a computer-readable memory device with instructions stored thereon to provide visual tools for failure analysis in distributed systems may be described. The instructions may include actions that are similar to the method described above.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device to provide visual tools for failure analysis in distributed systems, the method comprising:
   aggregating errors from synthetic measurements and usage data, the usage data including anonymized output of one or more customer actions associated with a use scenario of a cloud based service, based on one or more criteria that includes one or more from a set of: an error type and an identification of a type of an associated component of the cloud based service;
   processing the errors to create a distribution that segments the errors based on components of the cloud based service by:
      ranking the errors based on the error type and a relevancy to a stakeholder, and
      placing higher ranked errors above lower ranked errors in the distribution;
   highlighting a failed component that generates a subset of the errors associated with a failure in a visualization to be displayed, wherein the failed component is one of the components; and
   providing the distribution in the visualization to identify the failure by emphasizing the failed component with a failure information in proximity to the displayed failed component.

2. The method of claim 1, further comprising:
   parsing the usage data and the synthetic measurements that include output of simulations of the one or more customer actions.

3. The method of claim 1, further comprising:
   separating the errors into groups based on an association with the components; and
   creating a histogram from the groups as the distribution.

4. The method of claim 1, further comprising:
   computing a percentage of the errors associated with the subset of the errors by dividing a number of the subset with a number of the errors.

5. The method of claim 4, further comprising:
   in response to a determination that the percentage exceeds a threshold, identifying the failed component as a source of the failure.

6. The method of claim 5, further comprising:
highlighting the failed component with failure information by including a time period of the subset and a type of the subset in the distribution in proximity to the failed component.

7. The method of claim 1, further comprising:
providing failure information with one or more from a set of an identification of the failed component, a percentage of the subset, and a frequency of the subset within the distribution to identify the failed component.

8. The method of claim 1, further comprising:
detecting related components associated with the failed component based on a relation that includes one or more from a set of a shared connection, a shared data resource, and a shared operation.

9. The method of claim 8, further comprising:
ranking the related components based on an associated percentage of the errors generated by the related components.

10. The method of claim 9, further comprising:
placing the related components in proximity to the failed component based on the associated percentage to highlight the related components affected by the failure.

11. A computing device to provide visual toots for failure analysis in distributed systems, the computing device comprising:
a memory;
a processor coupled to the memory, the processor executing a management application in conjunction with instructions stored in the memory, wherein the management application is configured to:
aggregate errors from synthetic measurements and usage data based on one or more criteria that includes one or more from a set of: an error type and an identification of a type of an associated component of a cloud based service, wherein the usage data include anonymized output of customer actions of a use scenario of the cloud based service and the synthetic measurements include output of simulations of the customer actions;
process the errors to create a distribution that segments the errors based on components of the cloud based service by:
rank the errors based on the error type and a relevancy to a stakeholder, and
place higher ranked errors above lower ranked errors in the distribution;
highlight a failed component that generates a subset of the errors associated with a failure in a visualization to be displayed, wherein the failed component is one of the components; and
provide the distribution in the visualization to identify the failure by emphasizing the failed component with a failure information in proximity to the displayed failed component.

12. The computing device of claim 11, wherein the management application is further configured to:
detect an access privilege of a stakeholder through an authentication scheme, wherein the stakeholder is an administrator of the cloud based service.

13. The computing device of claim 12, wherein the management application is further configured to:
provide access to view granular information associated with the errors associated with the failed component, related components to the failed component, and other components of the cloud based service.

14. The computing, device of claim 11, wherein the management application is further configured to:

detect an access privilege of a stakeholder through an authentication scheme, wherein the stakeholder is a member of a team that manages the failed component of the cloud based service.

15. The computing device of claim 14, wherein the management application is further configured to:
provide access to view granular information associated with the errors associated with the failed component and the errors associated with related components to the failed component; and
restrict access to the errors associated with other components of the cloud, based service.

16. The computing device of claim 11, wherein the management application is further configured to:
allow a stakeholder to configure a threshold associated with detecting the failure, wherein the stakeholder includes an administer of the cloud based service and a team that manages the failed component of the cloud based service.

17. A hardware computer-readable memory device implemented in an integrated circuit (IC) with instructions stored thereon to provide visual tools for failure analysis in distributed systems, the instructions comprising:
aggregating errors from synthetic measurements and usage data based on one or more criteria that includes one or more from a set of: an error type and an identification of a type of an associated component of a cloud based service, wherein the usage data include anonymized output of customer actions of a use scenario of the cloud based service and the synthetic measurements include output of simulations of the customer actions;
processing the errors to create a distribution that segments the errors based on components of the cloud based service by:
ranking the errors based on the error type and a relevancy to a stakeholder, and
placing higher ranked errors above lower ranked errors in the distribution;
highlighting a failed component that generates a subset of the errors associated with a failure in a visualization to be displayed, wherein the failed component is one of the components: and
providing the distribution in the visualization to identify the failure by emphasizing the tailed component with a failure information in proximity to the displayed failed component.

18. The hardware computer-readable memory device implemented in the integrated circuit (IC) of claim 17, wherein the instructions further comprise:
detecting related components associated with the failed component based on a relation that includes one or more from a set of a shared connection, a shared data resource, and a shared operation;
ranking the related components based on an associated percentage of the errors generated by the related components; and
placing the related components in proximity to the failed component based on the associated percentage to highlight the related components affected by the failure.

19. The hardware computer-readable memory device implemented in the integrated circuit (IC) of claim 17, wherein the instructions further comprise:
computing a percentage of the errors associated with the subset of the errors by dividing a number of the subset with a number of the errors;

in response to a determination that the percentage exceeds a threshold, identifying the failed component as a source of the failure; and highlighting the failed component with failure information by including a time period of the subset and a type of the subset in the distribution in proximity to the failed component.

\* \* \* \* \*